Dec. 20, 1960    M. W. SAYLOR ET AL    2,964,840
LAMINATION INDEXING AND ASSEMBLING MACHINE
Filed Oct. 31, 1955
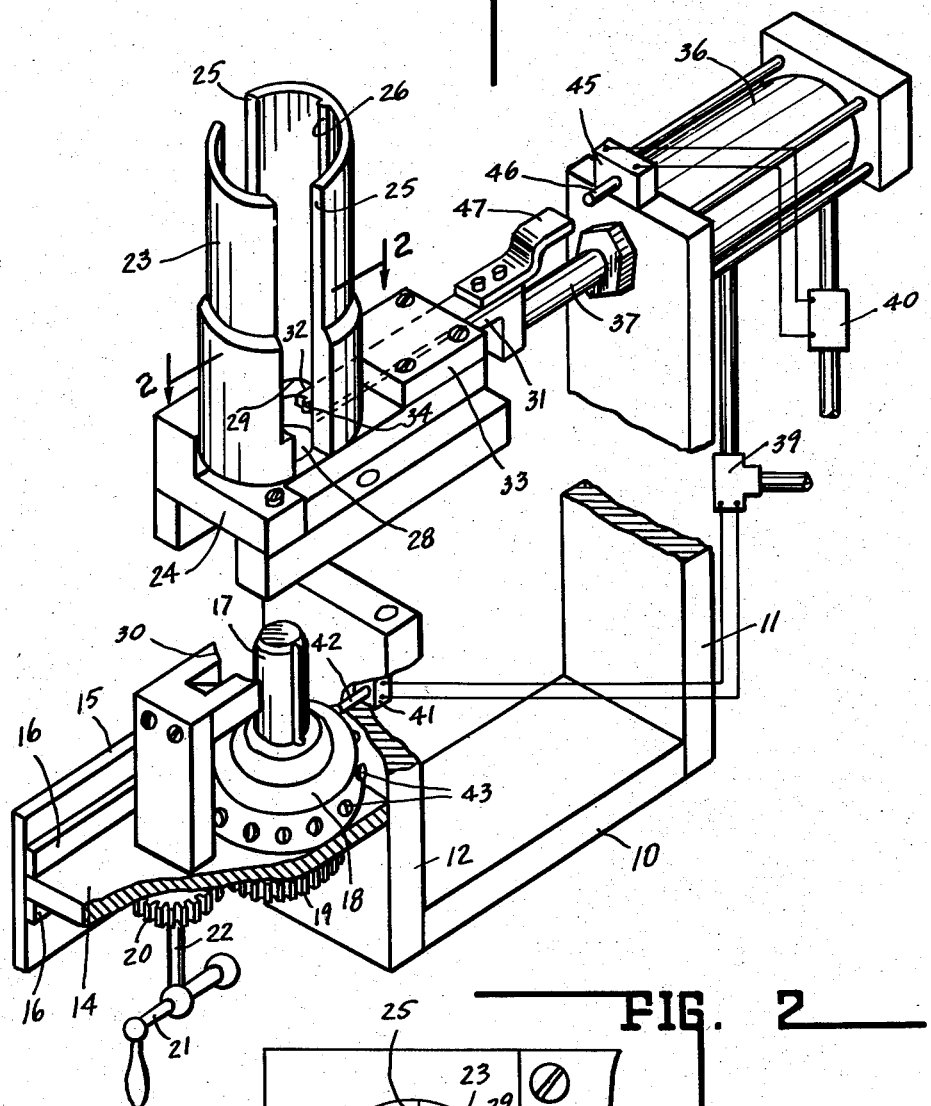
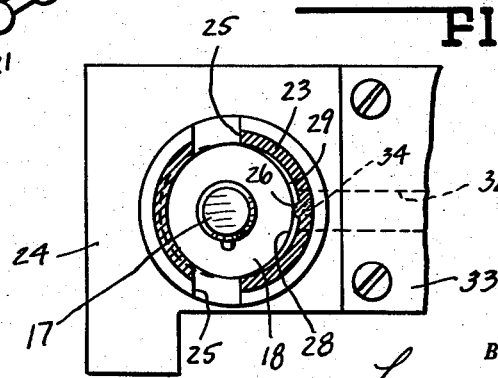
INVENTORS.
MATTHIAS W. SAYLOR.
THOMAS R. HARTER.
BY ROBERT E. KRAFFT,
Lockwood, Galt, Woodard & Smith
ATTORNEYS.

2,964,840

LAMINATION INDEXING AND ASSEMBLING MACHINE

Matthias W. Saylor, Thomas R. Harter, and Robert E. Krafft, Fort Wayne, Ind., assignors to The Magnavox Company, Fort Wayne, Ind., a corporation Filed Oct. 31, 1955, Ser. No. 543,888

5 Claims. (Cl. 29—203)

This invention relates generally to apparatus for automatically indexing and stacking lamination, and more particularly it relates to a lamination indexing and assembling machine adapted to stack a series of laminations while rotating each lamination slightly with respect to every other lamination.

The magnetic materials from which laminations are made for transformers and other electrical apparatus have a natural grain structure which effects the distribution of flux within a core formed of a stack of laminations. Consequently, a magnetic core formed of laminations having similar and aligned grain structure may have poor flux distribution which can have a deleterious effect on the performance of the core.

The principal object of this invention is to provide apparatus adapted to form magnetic cores by superimposing one lamination after another and rotating each successive lamination with respect to each adjacent lamination.

In accordance with this invention there is provided a lamination indexing and stacking device comprising a hopper, an arbor adapted to receive laminations from the hopper, means for rotating the arbor with respect to the hopper, and means controlled by the arbor during rotation thereof for extracting one lamination after another from the hopper and depositing it on said arbor.

The full nature of the invention will be understood from the accompanying drawings and the following description and claims:

Fig. 1 is an exploded perspective view of the apparatus provided by this invention.

Fig. 2 is a cross section taken on line 2—2 of Fig. 1.

Referring to the drawings, the apparatus as provided by this invention comprises a base 10 having upright members 11 and 12. A shelf 14 may be mounted to upright member 12 and a pair of side frames 15 for sliding support on the slides 16. A rotatable arbor may be mounted on shelf 14. The arbor consists of a center shaft 17 suitably supported in a bearing (not shown). A lamination supporting disc 18 may be fixed to shaft 17 above shelf 14. Below the shelf, there is provided a means for moving the arbor and displacing each lamination on the arbor with respect to previously dropped laminations comprising a drive gear 19 fixed to shaft 17 and driven by means of pinion 20 having a manually operable crank shaft 22 and crank 21. The crank shaft 22 may be rotatably mounted in a bearing (not shown) in shelf 14. Thus, by manually rotating the crank 21 the arbor 17 may be rotated at any desired speed.

A lamination receiving hopper 23 may be mounted on a platform 24, in turn supported on the upright 12. The hopper is slotted as at 25 to permit a stack of magnetic laminated iron to be lowered manually within the hopper. The laminations may be slotted on their peripheries and a key member 26 may be formed on the interior surface of the hopper to align the laminations with one another.

Within the platform 24 there is formed a lamination discharge aperture 28 and the hopper 23 may be offset with respect to the aperture so that the center line of the hopper bore is approximately one-eighth inch behind the center of the discharge aperture 28. Thus, there is formed a shelf 29 on platform 24 which engages the lowermost lamination of a stack to prevent the stack from falling through aperture 28. The shaft 17 is centered with respect to aperture 28 so that laminations drop directly onto the arbor 17.

For discharging one lamination at a time from the hopper 23, there is provided a slide member 31 mounted in a groove 32 in the upper surface of platform 24 and clamped therein by means of a block 33 fixed to the upper surface of platform 24 over the slide 31. Slide 31 includes a key 34 adapted to enter the key slot in each lamination to prevent rotation thereof when it is disengaged from the stack. The slide 31 at its leading edge is slightly thicker than the depth of the groove 32, whereby it may engage the edge of the lowermost lamination in the stack and move it off shelf 29. A stop 30 is mounted on shelf 14 for aligning the lowermost lamination with aperture 28 as the slide moves the lamination off shelf 29.

For reciprocating slide 31 there is provided a drive means comprising an air cylinder 36 having a conventional piston and shaft 37 connected to slide 31.

The air cylinder may be controlled by electrically operated valves 39 and 40 in accordance with well known practice. A first limit switch 41 may be mounted on the upright 12 with an actuating member 42 projecting through the upright 12 adjacent to the periphery of the arbor disc 18. A plurality of cams 43 are mounted on the periphery of arbor disc 18 to engage successively with the actuator 42, thereby to close the switch 41 and intermittently to actuate the valve 39 to cause cylinder 36 to move slide 31 away from the laminations stack after each lamination is dropped. Thus, there is provided a return stroke initiating means for said slide.

There is provided means for initiating a feed stroke of the drive means comprising a second limit switch 45 which may be mounted on the upper surface of upright 11 and may include an actuator 46 projecting outwardly thereof for engagement with a projecting member 47 mounted on slide 31. As slide 31 moves away from the stack of laminations, the outer end of member 47 engages actuator 46 to close switch 45 and actuate valve 40 for causing the air to be fed to the rear end of cylinder 36, whereby slide 31 is reversed.

In operation, a stack of laminations may be taken from the lamination cutting die and dropped within the hopper 23 with the key slots on the laminations registering with the key 26 of the hopper. The stack of laminations will rest on the shelf 29 and one lamination after another may be dropped therefrom as the slide 31 reciprocates.

Reciprocation of the slide is caused by manually rotating the crank 21 to rotate the arbor disc 18 and successively operate switch 41 by means of the cams 43. Whenever the switch 41 is actuated, the slide 31 moves away from the stack of laminations and is automatically reversed by switch 45. Thus, the leading edge of the slide 31 repeatedly engages the lowermost lamination of a stack, moving it into alignment with the aperture 28 to drop one lamination after another onto arbor disc 18. Since arbor disc 18 is rotating, each lamination is displaced angularly with respect to each previously dropped lamination. Thus, the effects of grain structure in lamination stacks are automatically distributed to provide a stack of assembled laminations having a relatively uniform flux distribution throughout its cross section.

The invention claimed is:

1. A lamination stacking and indexing machine comprising a base, a platform mounted over said base and having a lamination discharge aperture therein, a lamination receiving hopper mounted on said platform over said aperture and displaced slightly with respect thereto to form a lamination supporting shelf, a slide movably mounted on said platform and having a portion thereof in the plane of the lowermost lamination in said hopper, an air cylinder operatively associated with said slide for reciprocating it into engagement with said lowermost lamination for moving it into alignment with said discharge aperture, thereby to drop one lamination after another through said aperture, feed stroke and return stroke valves operatively associated with said cylinder, electrical switch means in the path of movement of a portion of said slide for controlling the feed stroke valve and initiating a feed stroke of said cylinder, a shelf between said platform and said base, an arbor disposed on said shelf in alignment with said discharge aperture for receiving one lamination after another, means for rotating said arbor, thereby to displace each lamination with respect to previously dropped laminations, a return stroke initiating switch means mounted adjacent to said arbor, and a plurality of spaced cams on the periphery of said arbor and movable into engagement with said switch for controlling the return stroke valve and initiating the return stroke of said slide after each lamination is dropped.

2. A lamination stacking and indexing machine comprising a base, a platform mounted over said base and having a lamination discharge aperture therein, a lamination receiving hopper mounted on said platform over said aperture and displaced slightly with respect thereto to form a lamination supporting shelf, a slide movably mounted on said platform and having a portion thereof in the plane of the lowermost lamination in said hopper, drive means operatively associated with said slide for reciprocating it into engagement with said lowermost lamination for moving it into alignment wtih said discharge aperture, thereby to drop one lamination after another through said aperture, electrical switch means in the path of movement of a portion of said slide for initiating a feed stroke of said drive means, a shelf between said platform and said base, an arbor disposed on said shelf in alignment with said discharge aperture for receiving one lamination after another, means for rotating said arbor, thereby to displace each lamination with respect to previously dropped laminations, a return stroke initiating switch means mounted adjacent to said arbor, and a plurality of spaced cams on the periphery of said arbor and movable into engagement with said switch for initiating the return stroke of said drive means after each lamination is dropped.

3. A lamination stacking and indexing machine comprising a lamination receiving hopper, a slide mounted adjacent the hopper having a portion thereof in the plane of the lowermost lamination in said hopper, an air cylinder operatively associated with said slide for reciprocating it into engagement with said lowermost lamination for dropping one lamination after another from said hopper, feed stroke and return stroke valves operatively associated with said cylinder, electrical switch means in the path of movement of a portion of said slide for initiating a feed stroke of said cylinder, an arbor beneath said hopper for receiving one lamination after another, means for rotating said arbor, thereby to displace each lamination with respect to previously dropped laminations, a return stroke initiating switch means mounted adjacent to said arbor, and a plurality of spaced cams on the periphery of said arbor and movable into engagement with said switch for initiating the return stroke of said slide after each lamination is dropped.

4. A lamination stacking and indexing machine comprising a lamination receiving hopper, a slide mounted adjacent the hopper having a portion thereof in the plane of the lowermost lamination in said hopper, drive means operatively associated with said slide for reciprocating it into engagement with said lowermost lamination for dropping one lamination after another from said hopper, electrical switch means in the path of movement of a portion of said slide for initiating a feed stroke of said drive means, an arbor beneath said hopper for receiving one lamination after another, means for rotating said arbor, thereby to displace each lamination with respect to previously dropped laminations, a return stroke initiating switch means mounted adjacent to said arbor, and a plurality of spaced cams on the periphery of said arbor and movable into engagement with said switch for initiating the return stroke of said drive means after each lamination is dropped.

5. A lamination stacking and indexing machine comprising a platform, a lamination receiving hopper, a slide movably mounted on said platform and having a portion thereof in the plane of the lowermost lamination in said hopper, drive means operatively associated with said slide for reciprocating it into engagement with said lowermost lamination for dropping one lamination after another from said hopper, means in the path of movement of a portion of said slide for initiating a feed stroke of said drive means, an arbor beneath said hopper for receiving one lamination after another, means for moving said arbor and displacing each lamination on said arbor with respect to previously dropped laminations, and a return stroke initiating means operatively associated with said arbor and operable thereby at regular intervals for initiating the return stroke of said slide after each lamination is dropped.

References Cited in the file of this patent
UNITED STATES PATENTS

| | | |
|---|---|---|
| 867,834 | Neureuther | Oct. 8, 1907 |
| 1,479,490 | Zomnir | Jan. 1, 1924 |
| 2,506,550 | Morrison | May 2, 1950 |
| 2,668,349 | Darin | Feb. 9, 1954 |